United States Patent [19]

De Bisschop et al.

[11] Patent Number: 4,754,103

[45] Date of Patent: Jun. 28, 1988

[54] X-Y POSITION INDICATOR FOR A DISPLAY SYSTEM

[75] Inventors: James De Bisschop, Litchfield; Raymond J. Drennen, Plantsville, both of Conn.

[73] Assignee: The Torrington Company, Torrington, Conn.

[21] Appl. No.: 77,490

[22] Filed: Jul. 24, 1987

[51] Int. Cl.⁴ .............. G08C 21/00; G05G 9/00; G01B 9/02
[52] U.S. Cl. .................................. 178/18; 33/1 M; 33/122; 74/471 XY
[58] Field of Search ............. 178/18, 19, 20; 33/1 M, 33/141 E, 122, 1 C, 123, 124; 340/710; 74/471 XY, 517

[56] References Cited

U.S. PATENT DOCUMENTS 4,628,755 12/1986 Hawley .................. 33/1 M X

Primary Examiner—Stafford D. Schreyer
Attorney, Agent, or Firm—Frank S. Troidl

[57] ABSTRACT

An X-Y position indicator control for manual movement over any surface to move a cursor over a display on a cathode ray tube, the indicator control generating signals indicating its position to cause a cursor to be displayed on the tube at the corresponding position. The indicator control mechanism contains X-Y position wheels mounted with their axes in perpendicular planes, which rotate according to the X and Y movements of the mechanism. Each position wheel is mounted on a flexible shaft. Each position wheel is resiliently urged into contact with the surface by the flexible shaft.

5 Claims, 2 Drawing Sheets

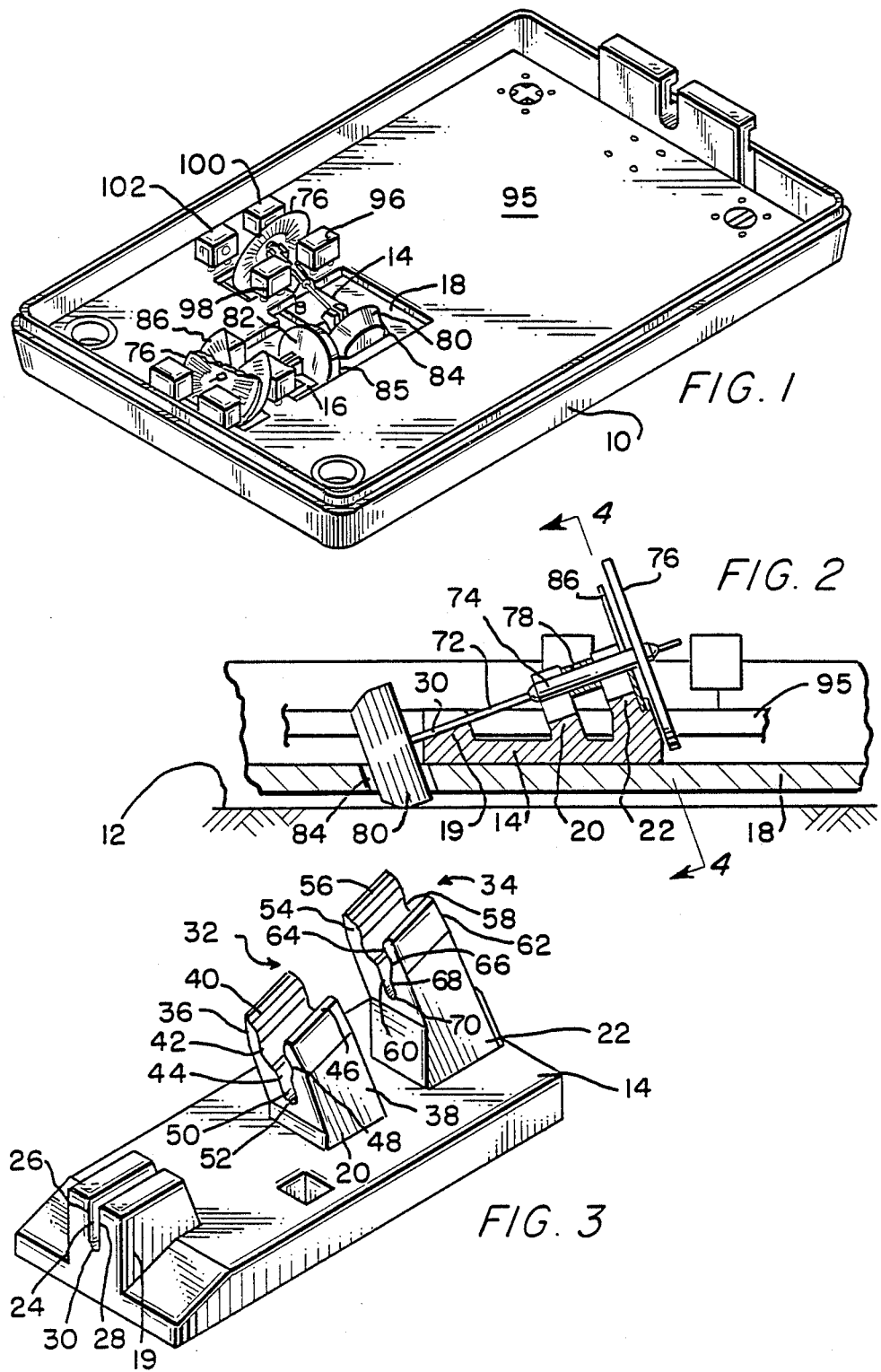

X-Y POSITION INDICATOR FOR A DISPLAY SYSTEM

This invention relates to visual display systems and more particularly to devices for altering the display at selective locations.

U.S. Pat. No. 3,541,541 to Engelbart teaches such a device with various transducer elements for converting positional movement of a device to positional signals for utilization by a display device. U.S. Pat. No. 3,892,963 to Hawley et al teaches the use of a transducer element for generating positional signals indicative of the respective rotation of the indicator wheels. One problem with the position wheels contained in the Engelbart U.S. Pat. No. 3,541,541 device and the Hawley et al U.S. Pat. No. 3,892,963 device is that in each device the position wheels are rigidly attached to the position wheel support. Thus, if the supporting surface upon which the position wheels rotate should not be perfectly flat, the wheels will lose contact with the supporting surface and an inaccurate display will occur on the cathode ray tube. The disadvantages of the Engelbart U.S. Pat. No. 3,541,541 device and the Hawley et al U.S. Pat. No. 3,892,963 device were eliminated by the X-Y position indicator for a display system described in U.S. Pat. No. 4,566,191 to Moseley. The Moseley position indicator position wheels remain in contact with the supporting surface even though the supporting surface may have some scratches or other defects which cause the position indicator to move over a supporting surface which is not perfectly flat.

The position indicator of this invention will also permit movement over a supporting surface which has scratches or other defects and still record accurate signals. However, the position indicator of this invention requires a fewer number of parts than the Moseley device by among other things, eliminating the biasing flat spring and ball bearing disclosed by Moseley in U.S. Pat. No. 4,566,191.

Briefly described, the position indicator is a device for use with a system for electronically representing the positional movement of the position indicator over a surface. The indicator includes a first position wheel and a second position wheel, both rotatably mounted in a housing. The axes of the position wheels are in perpendicular planes. Each position wheel is mounted on a separate rotatable, flexible shaft. Means responsive to the rotation of each of the position wheels indicate the speed and direction of rotation of each wheel. The housing is constructed to permit a rim portion of each wheel to extend past the bottom of the housing into contact with the surface.

The invention, as well as its many advantages, will be further understood by reference to the following detailed description and drawings in which:

FIG. 1 is a perspective view showing the position indicating device with the top of the housing removed;

FIG. 2 is a side elevational view, partly in section, and on an enlarged scale, of one of the modules of the embodiment of FIG. 1;

FIG. 3 is a perspective view of one of the flexible shaft modules of FIG. 1 with the flexible shaft removed;

In the various figures, like parts are referred to by like numbers.

Figure 4:
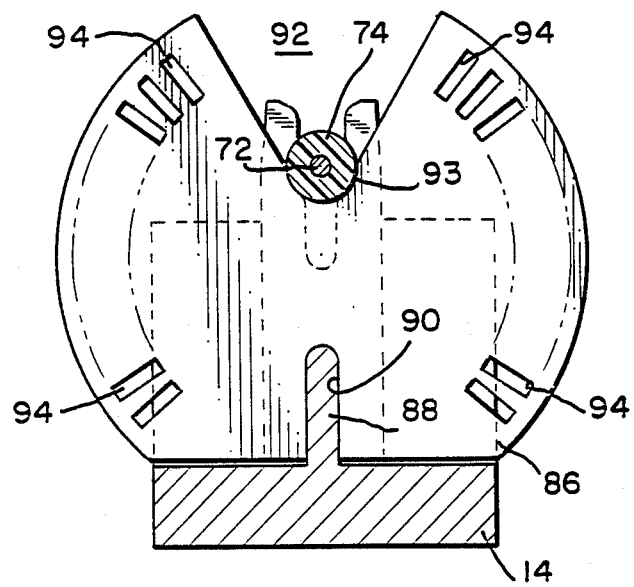
FIG. 4 is a sectional view taken along lines 4—4 of FIG. 2 and in the direction of the arrows.

Referring to the drawings and more particularly to FIG. 1, the new position indicator includes a housing, the bottom 10 of the housing being shown in FIG. 1. The housing is manually moved over the surface 12 (see FIG. 2). A pair of flexible shaft modules 14 and 16 are mounted on the base 18 of the housing. Module 14 has a flexible shaft front support 19 (see FIG. 3), a flexible shaft middle support 20, and a flexible shaft back support 22. The front support 19 is provided with a longitudinal groove 24 extending through the support 19. The longitudinal flexible shaft guide groove 24 is defined by straight sides 26 and 28 interconnected by the inclined curved bottom surface 30 (see FIG. 2).

Grooves 32 and 34 are provided along the tops of middle shaft support 20 and back shaft support 22, respectively. Front support 19, middle support 20 and back support 22 are axially spaced apart along the module 14. The grooves 24, 32, and 34, in front support 19, middle support 20, and back support 22, respectively are axially aligned. Groove 32 in the middle support 20 is defined by the inside surfaces of the flexible retaining arms 36 and 38. The inside surface of the flexible retaining arm 36 includes an axially inclined convex surface 40 followed by an axially inclined concave suface 42 followed by the axially inclined straight surface 44. The inside surface of the flexible retaining arm 38 of middle support 20 includes an axially inclined concave surface 46 followed by an axially inclined concave surface 48 followed by an axially inclined straight surface 50. The straight surfaces 44 and 50 are interconnectd by an axially inclined curved bottom surface 52.

The inside surface of flexible retaining arm 54 of back support 22 includes an axially inclined convex surface 56 followed by an axially inclined concave surface 58 followed by an axially inclined straight surface 60. The inside surface of the flexible retaining arm 62 has a axially inclined convex surface 64 followed by an axially inclined straight surface 68. The straight surfaces 60 and 68 are interconnected by an axially inclined curved bottom surface 70.

Figure 5:
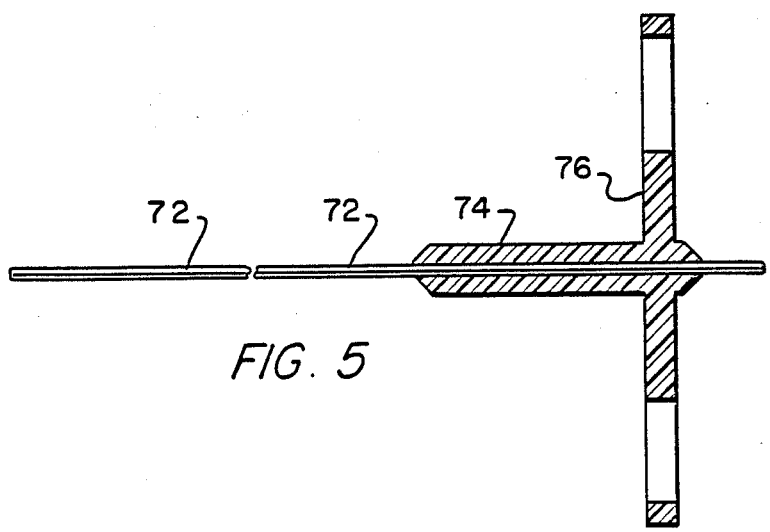
FIG. 5 is a view partly in section showing the flexible shaft and integral plastic encoder of the preferred embodiment.

Referring to FIGS. 2 and 5, a rotatable flexible shaft is mounted on the module 14. The flexible shaft has a spring steel cylindrical portion 72 extending axially from the front end of the shaft. The spring steel cylindrical portion is insert molded into an integral plastic tube 74 and the integral plastic encoder disc 76.

Referring to FIGS. 2 and 3, the plastic tube 74 has been snap-fit into the flexible shaft middle support 20 and flexible shaft back support 22. The plastic tube 74 is thereby retained in position by the concave axially inclined inside surfaces of the flexible retaining arms arms 54 and 62 of the back support 22. The spring steel portion 72 of the flexible shaft is guided within axially extending groove 24 of front support 19. An annular bushing 78 (see FIG. 2) is located about the plastic tube 74 and axially between and abutting the middle and back supports 20 and 22, respectively. The bushing keeps the middle and back supports the same distance apart despite the forces on the supports caused by the flexing of the rotatable flexible shaft.

A position wheel 80 is mounted on the free end of the flexible shaft spring steel portion 72. A position wheel 82 (see FIG. 1) is mounted on the free end of the other flexible shaft spring steel portion.

Referring to FIG. 1, the flexible shaft modules 14 and 16 are mounted on the base 18 of the housing in a manner such that the axies of the position wheels 80 and 82 are in perpendicular planes.

The housing base 18 is provided with an opening 84 extending therethrough. The position wheel 80, as can be seen from FIG. 2, extends through the opening 84 into contact with the surface 12. A second opening 85 extends through the base 18 through which the position wheel 82 extends into contact with the surface 12. Thus, a rim portion of each wheel extends through the base 18 into contact with the surface 12.

Referring to FIGS. 2 and 4, a shutter 86 is fixedly mounted on the back end of the module 14. The back end of the module 14 is provided with an upwardly extending finger 88 which fits into the complementary slot 90 in the shutter 86. A cut-out 92 in the shape of a sector extends toward the axis of the shutter 86 and has a curved bottom 93. When the flexible shaft is snap-fit into the module, the plastic tube 74 snap-fits into the shutter 86.

The shutter 86 is axially slightly spaced from the plastic encoder disc 76. A plurality of circumferentially equally spaced slots 94 (see FIG. 4) are provided in the shutter 86.

Referring to FIG. 1, a printed circuit board 95 is mounted in the housing just above the base 18. A pair of light emitting diodes 96 and 98 are mounted on the circuit board 95. Light emitting diode 96 is located adjacent one radial side of the plastic tube 74; light emitting diode 98 is located adjacent the opposite radial side ofthe plastic tube 74. The diodes 96 and 98 face the shutter 86. They are slightly axially spaced from the shutter 86.

A pair of photoelectric sensors 100 and 102 are positioned so that light from the light emitting diodes 96 and 98 will impinge upon the photoelectric sensors 100 and 102, respectively, when allowed to pass through the shutter and encoder disc located between the light emitting diodes and photoelectric sensors.

In operation, the coordinate information is generated as the position indicator is moved from one position to a second position along the surface 12. If the position indicator is moved vertically along surface 12, one of the position indicator wheels 80 and 82 will rotate while the other does not rotate. If the position indicator is moved horizontally along the surface 12, the other wheel rotates while the first wheel does not rotate. If the position indicator is moved from a first position to a second position which is not along a vertical or horizontal line as the move takes place, each wheel will both slide and rotate and the distance of rotation of each wheel supplies the X-Y coordinate information required to tell the computer that the position indicator has moved from the first point to the second point.

The flexible shafts resiliently urge each of the wheels 80 and 82 through the slots in the base of the housing and into contact with the surface 12. In the preferred embodiment shown, the cylindrical spring steel portion of the flexible shaft will flex upwardly (looking at FIG. 2). As the spring is flexed upwardly, it wants to assume its natural straight position and therefore exerts a bias against the position wheel. The spring 30 is sized so that the weight of the position device and operator's hand will easily overcome its force. Thus, when the position device is placed on the flat surface 12, the position wheels 80 and 82 are pushed upwards. With this arrangement, with the surface 12 even if the surface 12 is not completely flat. The spring must not be too narrow or there would not be sufficient firmness to maintain good contact of the wheel on the surface 12; yet the spring cannot be too stiff or there would not be sufficient force exerted against it to flex the spring. In general,the diameter of the spring portion should range from 0.012 inches to 0.015 inches.

The position wheels transmit rotary motion through the flexible shaft and the plastic encoder is rotated. The sizes and locations of the slots in the shutter and the sizes and locations of the slots in the corresponding plastic encoder are such that the X-Y position indicator movement in a plane is translated into signals which the computer system can use.

The module 14, the flexible shaft and encoder disc supported by module 14, and the shutter mounted on module 14 have been described herein in detail. The structure of module 16, the flexible shaft and encoder disc supported by module 16, and the shutter mounted on module 16 is the same as the corresponding parts of module 14.

We claim:

1. A position indicator device for use with a system for electronically representing the positional movement of said position indicator device over a surface comprising: a housing adapted to be moved along said surface; a first position wheel rotatably mounted in said housing; a second position wheel rotatably mounted in said housing; the axes of said first position wheel and said second position wheel being in perpendicular planes; each position wheel being mounted on a separate rotatable flexible shaft; means responsive to rotation of each of said first position wheel and said second position wheel for indicating the speed and direction of rotation of each of said wheels; said housing being constructed to permit a rim portion of each wheel to extend past the bottom of said housing into contact with the surface.

2. A position indicator device in accordance with claim 1 wherein: each position wheel is mounted adjacent one end of the rotatable flexible shaft, and said shaft is inclined with respect to the bottom of the housing.

3. A position indicator device in accordance with claim 2 wherein: each rotatable flexible shaft has a cylindrical portion extending axially from one end thereof and made of spring steel and having a diameter ranging from 0.012 inches to 0.015 inches and the position wheel is mounted adjacent the end of said cylindrical portion.

4. A position indicator device in accordance with claim 3 wherein: the spring steel portion of each rotatable flexible shaft extends into a plastic tube.

5. A position indicator device for use with a system for electronically representing the positional movement of said position indicator device over a surface comprising: a housing having a base and adapted to be moved along said surface; a pair of flexible shaft modules mounted on the housing base, each module having a flexible shaft front support, a flexible shaft middle support, and a flexible shaft back support, the flexible shaft front support having a groove along the top thereof, the flexible shaft middle and back supports each having a groove along the top thereof, the grooves in each of the three flexible shaft supports being aligned, each groove in the flexible shaft middle support and flexible shaft back support being defined by an inclined bottom surface and the inside surfaces of flexible retaining arms, each inside surface having an inclined concave surface located downwardly from the top of the support; a rotatable flexible shaft having a spring steel portion extending axially from its front end, the steel portion being insert molded into an integral plastic tube and integral encoder disc, the spring steel portion extending through the flexible shaft support and the plastic tube being snap-fit into the flexible shaft middle and back supports, the plastic tube fitting within the inclined concave surfaces of the grooves in the middle support and back support; a position wheel mounted on the free end of the flexible shaft spring steel portion, the housing being constructed to permit a rim portion of each wheel to extend through the base of said housing into contact with the surface; a shutter fixedly mounted on the back end of the module and about the plastic tube, said shutter being axially slightly spaced from the plastic encoder disc; a printed circuit board mounted on the housing bottom; a pair of light emitting members mounted on the circuit board, said light emitting members being located radially adjacent opposite sides of the plastic tube and facing the fixed shutter; and a pair of photoelectric sensors mounted on the circuit board and facing the plastic encoder.

* * * * *